(12) United States Patent
Janson et al.

(10) Patent No.: US 6,886,424 B2
(45) Date of Patent: May 3, 2005

(54) LAYSHAFT AUTOMATIC TRANSMISSION HAVING POWER-ON SHIFTING

(75) Inventors: David Allen Janson, Plymouth, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/603,855

(22) Filed: Jun. 25, 2003

(65) Prior Publication Data

US 2004/0261555 A1 Dec. 30, 2004

(51) Int. Cl.$^7$ ................................................ F16H 3/08
(52) U.S. Cl. ........................................ 74/329; 74/331
(58) Field of Search ......................... 74/340, 331, 325, 74/329, 339

(56) References Cited

U.S. PATENT DOCUMENTS

| | | | | |
|---|---|---|---|---|
| 4,461,188 A | * | 7/1984 | Fisher | 74/330 |
| 4,576,063 A | * | 3/1986 | Akashi et al. | 74/331 |
| 4,622,866 A | * | 11/1986 | Ito et al. | 74/336 R |
| 5,070,978 A | * | 12/1991 | Pires | 192/45.1 |
| 5,425,283 A | * | 6/1995 | Wehking | 74/331 |
| 5,597,057 A | * | 1/1997 | Ruth et al. | 192/46 |
| 5,711,409 A | | 1/1998 | Murata | |
| 5,720,203 A | | 2/1998 | Honda et al. | |
| 5,890,392 A | | 4/1999 | Ludanek et al. | |
| 5,915,512 A | | 6/1999 | Adamis et al. | |
| 5,950,781 A | | 9/1999 | Adamis et al. | |
| 6,044,719 A | | 4/2000 | Reed, Jr. et al. | |
| 6,065,576 A | * | 5/2000 | Shaw et al. | 192/46 |
| 6,095,001 A | * | 8/2000 | Ruehle et al. | 74/331 |
| 6,397,692 B1 | | 6/2002 | Carriere | |
| 6,427,549 B1 | * | 8/2002 | Bowen | 74/331 |
| 6,427,550 B1 | | 8/2002 | Bowen | |
| 2003/0051577 A1 | * | 3/2003 | Hirt | 74/331 |
| 2003/0154810 A1 | * | 8/2003 | Hedman | 74/331 |

* cited by examiner

*Primary Examiner*—Roger Pang
(74) *Attorney, Agent, or Firm*—Davis B. Kelly (57) ABSTRACT

A power transmission for a motor vehicle includes an input, a first layshaft, a second layshaft; a first power path for transmitting power between the input and first layshaft, and producing a first ratio of a speed of the first layshaft and a corresponding speed of the input, a second power path for transmitting power between the input and second layshaft, and producing a second ratio of the speed of the second layshaft and corresponding speed of the input; and a clutch for releasably connecting the input and first power path.

24 Claims, 6 Drawing Sheets

| Pinion/Gear | Number of Teeth |
|---|---|
| 60 | 43 |
| 66 | 35 |
| 42 | 29 |
| 46 | 25 |
| 50 | 23 |
| 56 | 43 |
| 58, 62 | 19 |
| 64, 68 | 27 |
| 40 | 33 |
| 44 | 37 |
| 48 | 41 |
| 54 | 19 |
| 52 | 19 |
| 38, 38' | 38 |
| 36 | 27 |
| 26, 26' | 26 |
| 28 | 37 |

Figure 3

| | \_ | Clutch / Coupler States | | | | |
|---|---|---|---|---|---|---|
| | 70 | 82 | 84 | 86 | 22 | 30 |
| Ready for forward launch | Left | Neutral | Neutral | Neutral | Off | - |
| Completion of forward launch | Left | Neutral | Neutral | Neutral | Applied | - |
| 1->2 shift, step 1 | Left | Neutral | Neutral | Left | Applied | O/R |
| 1->2 shift, step 2 | Left | Neutral | Neutral | Left | Off | X |
| 1->2 shift, step 3 | Right | Neutral | Neutral | Left | Off | X |
| 1->2 shift, step 4 | Right | Neutral | Neutral | Left | Applied | O/R |
| 1->2 shift, complete | Right | Neutral | Neutral | Neutral | Applied | - |
| 2->3 shift, step 1 | Right | Neutral | Neutral | Right | Applied | O/R |
| 2->3 shift, step 2 | Right | Left | Neutral | Right | Off | X |
| 2->3 shift, step 3 | Neutral | Left | Neutral | Right | Off | X |
| 2->3 shift, step 4 | Neutral | Left | Neutral | Right | Applied | O/R |
| 2->3 shift, complete | Neutral | Left | Neutral | Neutral | Applied | - |

Figure 3 cont.

| | Clutch / Coupler States | | | | | |
|---|---|---|---|---|---|---|
| | 70 | 82 | 84 | 86 | 22 | 30 |
| 3->4 shift, step 1 | Neutral | Left | Neutral | Neutral | Off | - |
| 3->4 shift, step 2 | Neutral | Right | Neutral | Neutral | Off | - |
| 3->4 shift, complete | Neutral | Right | Neutral | Neutral | Applied | - |
| 4->5 shift, step 1 | Neutral | Right | Neutral | Neutral | Off | - |
| 4->5 shift, step 2 | Neutral | Neutral | Left | Neutral | Off | - |
| 4->5 shift, complete | Neutral | Neutral | Left | Neutral | Applied | - |
| Ready for reverse launch | Neutral | Neutral | Right | Neutral | Off | - |
| Completion of reverse launch | Neutral | Neutral | Right | Neutral | Applied | - |

| | Speeds | | | | Torque Ratio |
|---|---|---|---|---|---|
| | Primary | Secondary | Clutch | Output | |
| Ready for forward launch | 0.000 | - | 1.000 | 0.000 | 0.000 |
| Completion of forward launch | 0.711 | - | 0.000 | 0.314 | 3.185 |
| 1->2 shift, step 1 | 0.711 | 0.711 | 0.000 | 0.314 | 3.185 |
| 1->2 shift, step 2 | 0.703 | 0.703 | 0.011 | 0.310 | 3.221 |
| 1->2 shift, step 3 | 0.402 | 0.703 | 0.434 | 0.310 | 3.221 |
| 1->2 shift, step 4 | 0.711 | 1.240 | 0.000 | 0.548 | 1.824 |
| 1->2 shift, complete | 0.711 | - | 0.000 | 0.548 | 1.824 |
| 2->3 shift, step 1 | 0.711 | 0.711 | 0.000 | 0.548 | 1.824 |
| 2->3 shift, step 2 | 0.703 | 0.703 | 0.011 | 0.542 | 1.845 |
| 2->3 shift, step 3 | 0.476 | 0.703 | 0.330 | 0.542 | 1.845 |
| 2->3 shift, step 4 | 0.711 | 1.830 | 0.000 | 0.809 | 1.237 |
| 2->3 shift, complete | 0.711 | - | 0.000 | 0.809 | 1.237 |

*Figure 4*

|  | Speeds | | | Torque Ratio |
| --- | --- | --- | --- | --- |
| | Primary | Secondary | Clutch | Output | |
| 3->4 shift, step 1 | 0.711 | - | 0.000 | 0.809 | 0.000 |
| 3->4 shift, step 2 | 0.546 | - | 0.231 | 0.809 | 0.000 |
| 3->4 shift, complete | 0.711 | - | 0.000 | 1.052 | 0.951 |
| 4->5 shift, step 1 | 0.711 | - | 0.000 | 1.052 | 0.000 |
| 4->5 shift, step 2 | 0.590 | - | 0.170 | 1.052 | 0.000 |
| 4->5 shift, complete | 0.711 | - | 0.000 | 1.267 | 0.790 |
| Ready for reverse launch | 0.000 | - | 1.000 | 0.000 | 0.000 |
| Completion of reverse launch | 0.711 | - | 0.000 | -0.314 | -3.185 |

*Figure 4 cont.*

LAYSHAFT AUTOMATIC TRANSMISSION HAVING POWER-ON SHIFTING

BACKGROUND OF THE INVENTION

1. Field of the Invention

This invention pertains to the field of automatic shift manual transmissions and select shift manual transmissions, particularly to the types of these transmissions applicable to motor vehicles.

2. Description of the Prior Art

Automatic transmissions for transmitting power between an input and an output, either over a continuously variable range of speed ratios or in discrete step changes among speed ratios, have associated with them several sources of parasitic losses, which adversely affect fuel economy. These losses are associated with a torque converter, open hydraulic friction clutches and brakes, hydraulic pump, and gear meshes.

To improve fuel economy in a motor vehicle having an automatic transmission, an automated shift manual (ASM) transmission can be used to eliminate or substantially reduce all of these parasitic losses except gear mesh losses. An ASM transmission generally performs gear ratio changes by first interrupting torque transmitted from the engine to the transmission input, preparing the transmission components associated with the next speed ratio, and then restoring torque. A primary functional feature of ASM transmissions is the need to interrupt power transmitted from the engine to the transmission input shaft before or during each gear ratio change. This requirement can result in low quality gear ratio changes, which a vehicle operator or passenger may sense as noise, vibration and harshness.

A transmission operating in accordance with the present invention avoids entirely any interruption of power during gear ratio changes and avoids the inherent shift quality problems of ASMS. This invention, however, also reduces the magnitude of parasitic losses inherent in the operation of an automatic transmission to a much lower magnitude than is present in a conventional ASM transmission.

SUMMARY OF THE INVENTION

A transmission according to the present invention includes only one friction clutch for releasably connecting a source of power, such as an engine or motor, and a transmission input. Gear ratio changes are accomplished through the use of couplers, such as synchronizers or dog clutches, which mutually driveably connect components operative in each speed ratio, which couplers produce very little drag loss when engaged, and do not require a continuous supply of power to stay engaged.

Power interruption during shifting is avoided by providing alternate torque or power paths, which transmit power between a transmission input and the output during a gear ratio change. A secondary power path bypasses the friction clutch, but contains a one-way clutch. Before starting an upshift from an initial gear to a higher gear, one power path is set for a slightly lower speed ratio than the initial gear by engaging synchronizers or dog clutches, thereby causing the one-way clutch to overrun. In order to transfer power to the second torque path, the friction clutch is released and the secondary power path carries torque through the one-way clutch. Transfer of torque to the secondary power path is essentially a downshift to a speed ratio that is slightly lower than the current or off-going gear ratio.

While the secondary power path carries torque, the main or primary power path is set similarly for the destination gear of the gearshift by engaging synchronizers or dog clutches. When the friction clutch is re-engaged, torque is transferred back to the primary torque path causing the one-way clutch to overrun again. Downshifts are accomplished by reversing this sequence of steps.

All the gear ratio changes including the acceleration of the vehicle from a stop or idle condition, usually referred to as launch, use the same friction clutch. The only additional hardware required is a one-way clutch, the gearing, and a coupler on a second layshaft associated with the secondary torque path.

The principle of the present invention can be applied to all of the up-shifts of a particular transmission or any number of the up-shifts depending upon the number of secondary torque paths that are provided.

In realizing these advantages, a power transmission for a motor vehicle includes an input; a first layshaft driveably, supporting a first pinion thereon; a clutch for alternately connecting and disconnecting the input and first layshaft; a first coupler for releasably coupling the first pinion and first layshaft; a second layshaft driveably connected through a one-way drive connection to the input, supporting a second pinion thereon; a second coupler for selectively releasably coupling the second pinion and second layshaft; and an output shaft supporting a gear thereon, said gear being in meshing engagement with the first pinion and second pinion.

DESCRIPTION OF THE PREFERRED EMBODIMENT

Figure 1:
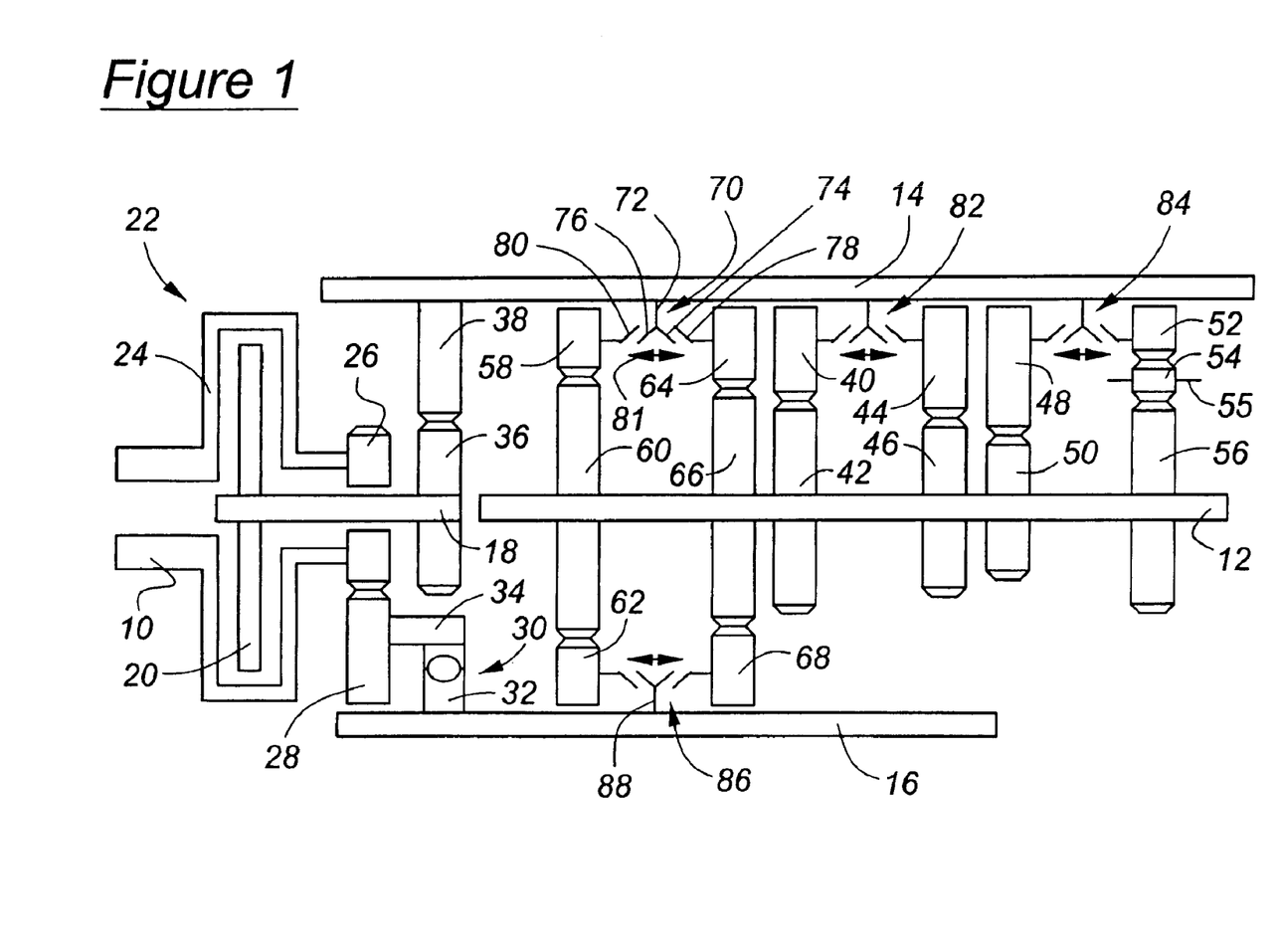
FIG. 1 is a schematic diagram showing the gear arrangement of the transmission according to the present invention.

Referring now to FIG. 1 a transmission according to the present invention includes an input 10 adapted to driveably connect a power source, such as an internal combustion engine or electric motor, and an output 12 for driving a load, such as the driven wheels of a motor vehicle connected through a powertrain that may include a drive shaft, differential mechanism, and axle shafts.

A primary layshaft 14 and secondary layshaft 16, arranged substantially parallel to the output 12, each support pinions that are in continually meshing engagement with gears supported rotatably on the output 12.

A clutched input 18, preferably substantially aligned with output 12, is releasably connected to input 10 through a friction clutch 22, whose output element 20 frictionally engages the clutch's input element 24, which is drivably connected to input 10.

A pinion 26, journalled on member 24 and connected to input 10, is engaged with a gear 28, which is journalled on secondary layshaft 16. A one-way clutch 30, also supported rotatably on layshaft 16, has an inner race 32 fixed to layshaft 16 and an outer race 34 drivably connected to gear 28.

Clutched input 18 supports a pinion 36, which is in continual meshing engagement with gear 38, supported rotatably on primary layshaft 14.

Figure 2:
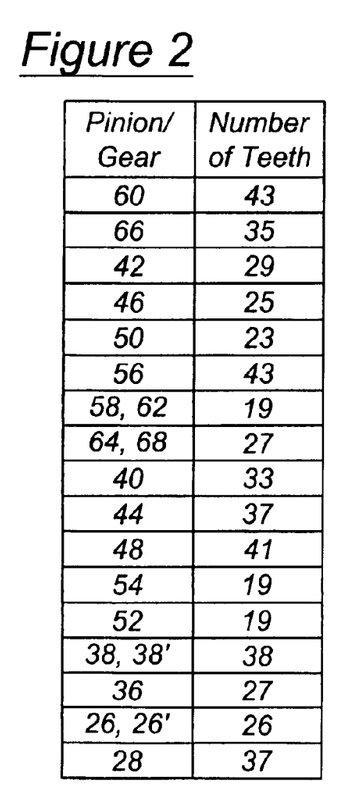
FIG. 2 is a chart containing an example of the number of teeth for each of the gears and pinions shown in FIG. 1.

In this way, a primary power path, having a speed ratio that is approximately 0.711 when pinion 36 and gear 38 have the number of teeth specified in FIG. 2, is established between input 10 and layshaft 14. When clutch 22 is engaged, the primary power path causes the speed of layshaft 14 to be approximately 0.711 times the speed of input 10. A secondary power path, having a speed ratio of approximately 0.703 when pinion 26 and gear 28 have the number of teeth specified in FIG. 2, is established between layshaft 16 and input 10. Clutch 30 drivable connects gear 28 and layshaft 16 when input 10 drives layshaft 16, and clutch 30 overruns when the speed of layshaft 16 exceeds the speed of gear 28. When clutch 30 is driving, the secondary power path causes the speed of layshaft 16 to be approximately 0.703 times the speed of input 10.

Spaced axially along output 12 are gear elements of pinion-gear pairs, each member of a pair in continuous meshing engagement with the other member of the pair, and each pair being associated with a particular speed ratio. For example, pinion 40, which is journalled on layshaft 14, is in continuous meshing engagement with gear 42, which is rotatably supported on output 12. Pinion 40 and gear 42 are associated with the third forward speed ratio. Pinion 44, journalled on layshaft 14, is in continuous meshing engagement with gear 46, which is rotatably supported on output 12. Pinion 44 and gear 46 are associated with the fourth forward speed ratio. Pinion 48, journalled on layshaft 14, is in continuous meshing engagement with gear 50, which is rotatably supported on output 12. Pinion 48 and gear 50 are associated with the fifth forward gear ratio.

Reverse pinion 52, journalled on layshaft 14, is in continuous meshing engagement with reverse idler 54, which is supported rotatably on an idler shaft 55. Reverse output gear 56, which is rotatably supported on output 12, is in continuous meshing engagement with reverse idler 54. Pinion 52, idler 54 and gear 56 are associated with the reverse gear ratio.

Also spaced along the axis of output 12 are triplets comprising two pinions, one of each pinion being supported on layshaft 14 and the other on layshaft 16, and a gear supported on and fixed to output 12. For example, pinion 58, which is journalled on layshaft 14, is in continuous meshing engagement with gear 60, supported on output 12. Pinion 62, which is journalled on layshaft 16, is also in continuous meshing engagement with gear 60. Pinion 58, gear 60 and pinion 62 form a triplet that is associated with the first forward gear ratio.

Pinion 64, journalled on layshaft 14, is in continuous meshing engagement with gear 66, supported on output 12. Pinion 68, which is journalled on layshaft 16, is in continuous meshing engagement with output gear 66. Pinion 64, gear 66 and pinion 68 form a triplet that is associated with the second forward gear ratio.

Couplers 70, 82, 84 and 86, are preferably synchronizers of the type used in manual automotive transmissions to connect releasably a gear or pinion to a shaft after first synchronizing the speed of the shaft and that of the pinion or gear. A coupler may also be disengaged from any pinion or gear. An example of such a synchronizer is disclosed in U.S. Pat. No. 4,222,281. Alternatively the couplers may be a toothed clutch having dogteeth that are engaged with clutch teeth on a gear or pinion. This invention may use couplers in any combination of synchronizers and dog clutches.

Each coupler, for example coupler 70, is fixed by a hub 72 on a layshaft 14 for rotation at the speed of that layshaft. In the case where a coupler is a synchronizer, it will be provided with a conical surface 74, 76, which engages mutually with a corresponding conical surface 78, 80, respectively, on the pinions located adjacent the synchronizer. When these conical surfaces are forced together into frictional contact, that engagement synchronizes the speed of layshaft 14 to that of the pinion being engaged and drivably connected through the synchronizer to layshaft 14. Generally the synchronizer is equipped with a sleeve 81 supported on the hub 72 for sliding movement leftward and rightward into engagement with dogteeth carried on the pinion. When the dogteeth of the sleeve engage those of the pinion, the pinion is connected to the layshaft.

The hubs of couplers 82, 84 are rotatably secured to layshaft 14; the hub 88 of coupler 86 is rotatably secured to layshaft 16.

In the case where the coupler 70 is a clutch, movement of the sleeve 81 causes mutual engagement of dog teeth formed on the sleeve and dog teeth carried on the pinions so that a drive connection is made between the pinion and the layshaft, but without first synchronizing the speed of the layshaft and the pinion.

A coupler 82, located between pinions 40 and 44, releasably connects alternately those pinions and layshaft 14, and coupler 82 may be disengaged from both pinions. Coupler 84, located between pinions 48 and 52, selectively, alternately produces a drive connection between layshaft 14 and the selected pinion, and coupler 84 may be disengaged from both pinions. Another coupler 86 includes a hub 88 drivably connected and supported for rotation on the secondary layshaft 16. Coupler 86 is located between pinions 62 and 68 in order to selectively produce a drive connection between layshaft 16 and those pinions.

In FIG. 1 the couplers 70, 82, 84, 86 are shown in a neutral position, between the left-hand and right-hand extremities of travel of the connecting element or sleeve, whose engagement with the dog teeth carried on the pinions completes the drive connection of the pinion and associated layshaft.

Figure 3:
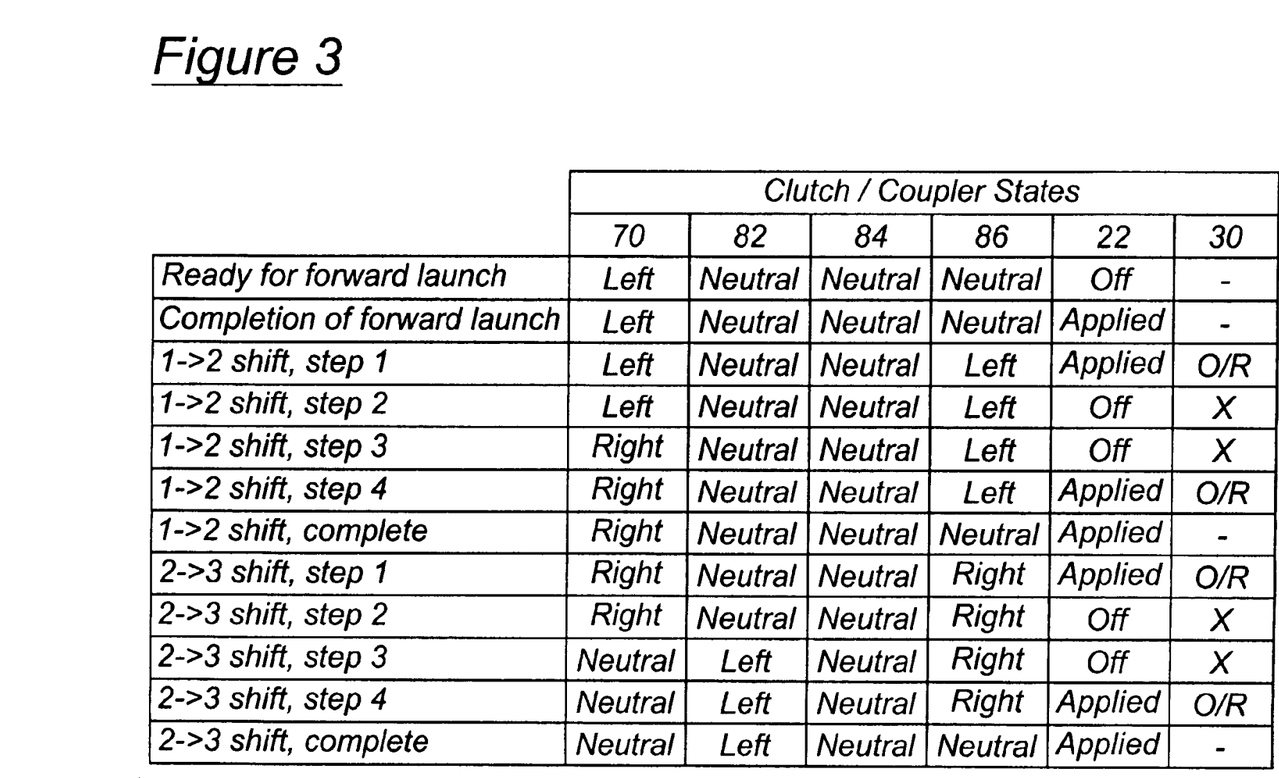
FIG. 3 is a chart that indicates the state of engagement of a friction clutch and the couplers corresponding to the steps for producing gear ratio changes in a transmission according to the present invention.

Referring now to FIG. 3, operation of the transmission will be discussed with reference to the positional states of the couplers and the applied or released condition of clutch 22. The transmission is prepared for forward acceleration of the vehicle from rest in the first gear ratio when the engagement sleeve 81 of coupler 70 is moved leftward, the other couplers 82, 84 and 86 are in the neutral position, and clutch 22 is disengaged. The power source continually drives input 10 and pinion 26 at the speed of the power source; gear 28 is driven by pinion 26 at the speed ratio of the secondary power path, i.e., 0.703 times the speed of input 10, provided the gears and pinions have the sizes of the example of FIG. 2. However, since coupler 86 is in the neutral position, no power is transferred to output 12, and the speed of output 12 is zero. Next, clutch 22 is applied, either manually by the vehicle operator's manipulation of a clutch pedal, lever or button, or automatically in response to a signal produced by a transmission electronic control system. When clutch 22 is engaged, primary layshaft 14 is driven through clutch 22, input 18, pinion 36, and gear 38 at the speed ratio of the primary power path, i.e., 0.711 times the speed of input 10.

Output 12 is driven from layshaft 14 through coupler 70, pinion 58 and gear 60, which is drivably fixed to output 12. These actions complete the engagement of the first forward speed ratio, whereby the output 12 is driven at a speed ratio of 0.314.

An upshift from the first to the second speed ratio is accomplished in a series of steps that begins by moving the engagement element or sleeve of coupler 86 leftward to drivably connect pinion 62 and the secondary layshaft 16. This action causes one-way clutch 30 to overrun or permits it to continue to overrun. Then clutch 22 is released, thereby causing one-way clutch 30 to driveably connect layshaft 16 and gear 28, which drives output 12 through gear 60 at a speed ratio of 0.310, a slight downshift from the first gear ratio, 0.314. Next, the engagement element or sleeve of coupler 70 is moved from the left-hand to the right-hand position, thereby drivably connecting pinion 64 and layshaft 14. Output 12 remains driven through the secondary power path at a speed ratio of 0.310. Clutch 22 is then applied, causing one-way clutch 30 to overrun, and driving output 12 through the primary power path: pinion 36, gear 38 and layshaft 14, which drives second speed pinion 64 and second speed gear 66. Moving the sleeve of coupler 86 to the neutral position, i.e., out of engagement with pinion 62 completes the upshift to the second speed ratio from the first speed ratio. Output 12 is driven at a speed ratio of 0.548.

The torque delivery path in the second forward speed ratio includes input 10, clutch 22, input 18, gear 36, pinion 38, layshaft 14, coupler 70, pinion 64, gear 66, and output 12.

An upshift from a second speed ratio to the third speed ratio is similarly accomplished in a series of steps that begins by moving the selection sleeve of coupler 86 to the right-hand position from the neutral position, thereby driveably connecting pinion 68, gear 66, and output 12 through coupler 86, and layshaft 16. With the transmission components so disposed, one-way clutch 30 overruns, and the output remains driven through the primary power path at the 0.548 speed ratio. Then clutch 22 is released, which causes clutch 30 to produce a drive connection between layshaft 16 and gear 28. The output 12 is driven through the secondary power path, pinion 68 and gear 66 at a slightly reduced speed ratio of 0.542. Next, the selector sleeve of coupler 70 is moved to the neutral position and the selector sleeve of coupler 82 is moved to the left-hand position, thereby drivably connecting layshaft 14 and pinion 40. The output remains driven through the secondary power path at the 0.542 speed ratio. Then clutch 22 is reapplied, which action causes one-way clutch 30 to overrun and output 12 to be driven again through the primary power path, pinion 40 and gear 42 at the third forward speed ratio, 0.809. Finally the upshift to the third speed ratio is completed by disengaging the secondary torque delivery path upon moving the selector element 88 of coupler 86 to the neutral position.

In the speed ratio changes described, only speed ratio changes to the second and third forward speed ratios involve transmitting power through the secondary power path, i.e., without interrupting power flow between the engine and the transmission. However, any number of the gear ratio changes could employ the secondary torque delivery path to avoid power interruption, provided a pinion corresponding to each of such speed ratios is supported on layshaft 16 and meshes with the output gear of the corresponding gear ratio. Speed ratio changes to the fourth and fifth speeds involve interrupting power flow from the engine to the transmission by disengaging clutch 22.

An upshift from the third to the fourth forward speed ratio begins with the step of disengaging clutch 22. Clutch 30 is inoperative during engagement of the third and fourth forward gears and reverse gear. Next, the selection element or sleeve of coupler 82 is moved to the right-hand position, thereby driveably connecting layshaft 14 and pinion 44. Finally re-engaging clutch 22 complete the fourth forward speed ratio. The torque delivery path for the fourth speed ratio includes input 10, clutch 22, input 18, pinion 36, gear 38, layshaft 14, coupler 82, pinion 44, gear 46, and output 12. The fourth speed ratio is 1.052. Similarly an upshift from the fourth to the fifth forward speed ratio begins by disengaging clutch 22. Next, the selector element of coupler 82 is moved from the right-hand position to the neutral position, and the selector element of coupler 84 is moved from the neutral position to the left-hand position, thereby driveably connecting layshaft 14 and pinion 48. Re-engaging clutch 22 complete the upshift to the fifth forward speed ratio. The torque delivery path for the fifth forward speed ratio includes input 10, clutch 22, input 18, pinion 36, gear 38, layshaft 14, coupler 84, pinion 48, gear 50, and output 12. The fifth speed ratio is 1.267.

Reverse drive is produced when the selector elements of couplers 70, 82, and 86 are in the neutral position and the selector element of coupler 84 is moved to the right-hand position, thereby driveably connecting pinion 52 and layshaft 14. Reverse idler 54, which is rotatably supported on idler shaft 55, reverses the direction of rotation so that gear 56 and the output 12 turn in the opposite direction of rotation from the direction the forward drive gear ratios. Reapplying clutch 22 completes the reverse drive torque delivery path. The torque delivery path for reverse drive includes input 10, clutch 22 shaft 18, pinion 36, gear 38, layshaft 14, coupler 84, pinion 52, reverse idler 54, gear 56, and output 12. The reverse drive speed ratio is −0.314.

Figure 4:
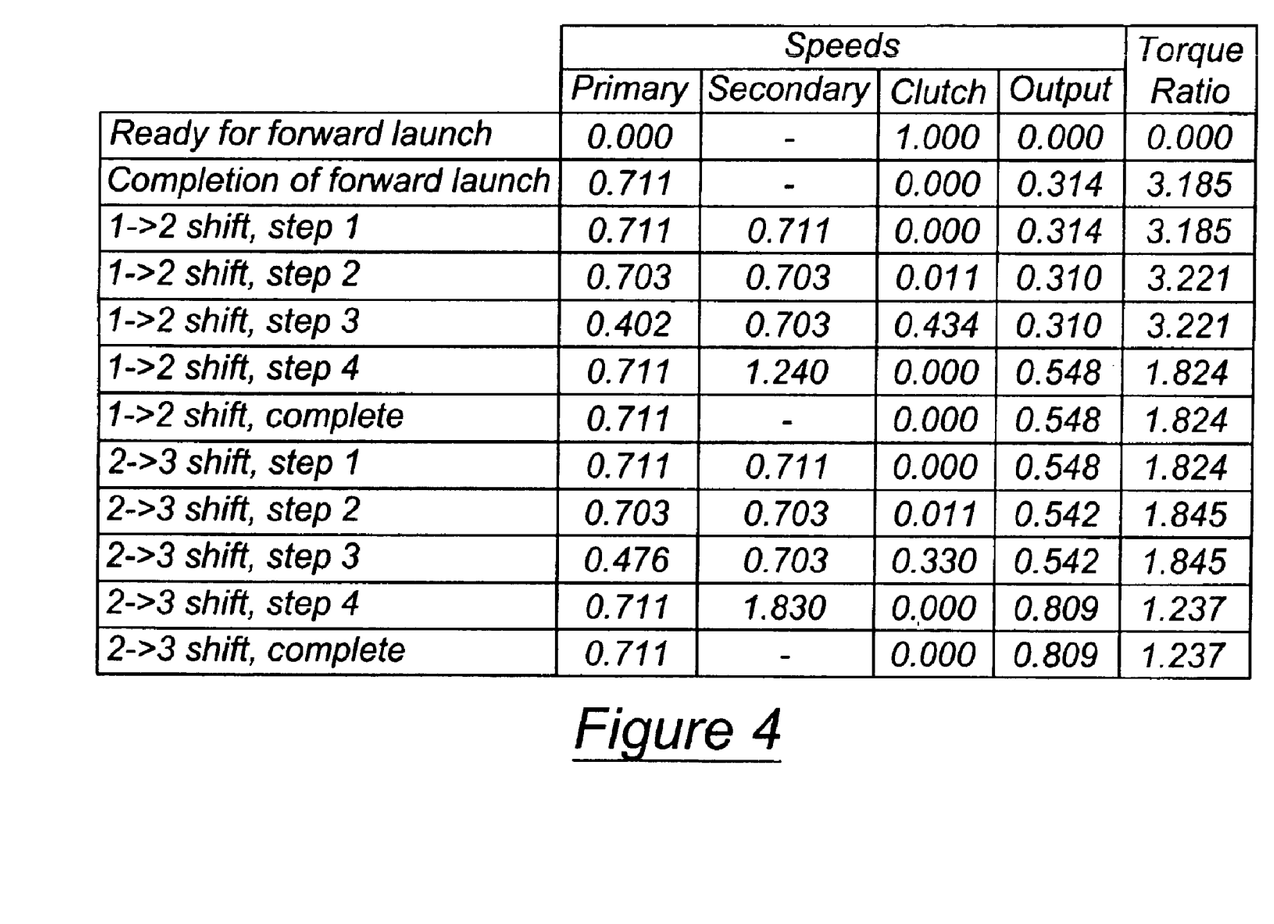
FIG. 4 is a chart that shows an example of the resulting speed ratios for various paths and components, a torque ratio and the gear ratio steps corresponding to various operating steps of the chart of FIG. 3.

The example set out in FIG. 4 was selected to produce the gear ratios that would result from the transmission embodiment of FIG. 1 and using the gear and pinion sizes of FIG. 2.

The one-way clutch 30 represents a one-way drive connection through which the input is connected to the second layshaft, and may be any of the following: a one-way clutch, a sprag-type one-way clutch, a roller-type one-way clutch, a mechanical diode of the type described in U.S. Pat. Nos. 5,070,978; 5,597,057 and 6,065,576.

Figure 5:
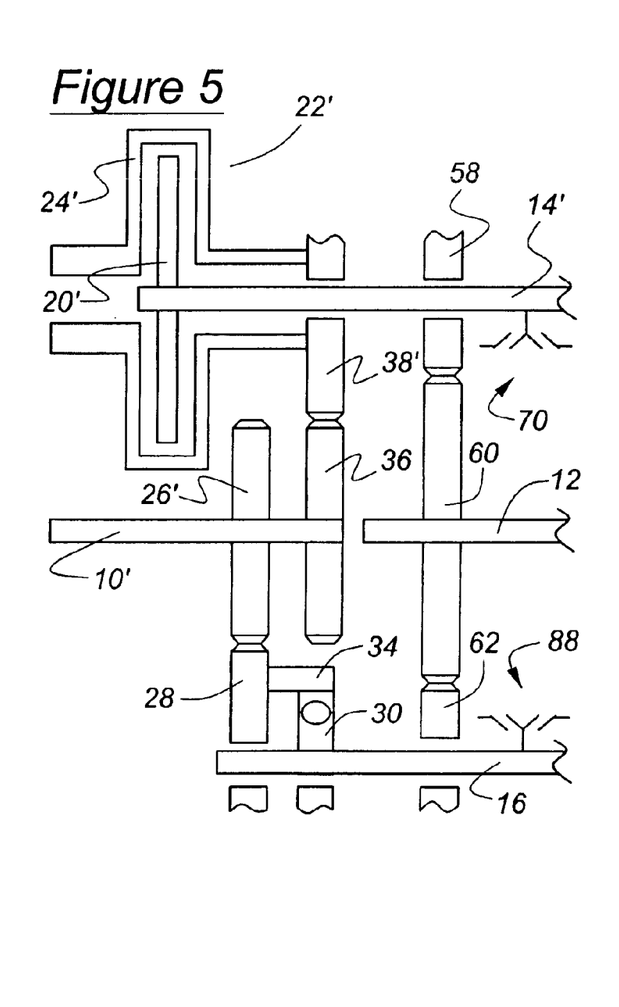
FIG. 5 is a schematic diagram showing another arrangement of the power path in which the input clutch is located on the first layshaft.

Referring now to the alternate embodiment of FIG. 5, an input 10' supports and is driveably connected to both a pinion 26' of the second power path, and a pinion 36 of the first power path. Pinion 26' is engaged with gear 28, which is supported on the second layshaft; pinion 36 is engaged with gear 38', which is journalled on the first layshaft 14' and is driveably connected to a clutch 22'. Gear 28 is connected through a one-way drive connection 30, to second layshaft 16.

Preferably clutch 22' is a multiple plate friction clutch, and may have a housing 24' connected to gear 38', and a disc 20' carried on layshaft 14'. The disc moves alternately into frictional engagement with housing 24' to connect gear 38' and layshaft 14' when the clutch is applied, and out of engagement with the housing to disconnect gear 38' and layshaft 14' when the clutch is released.

An ASM transmission operating in accordance with the present invention avoids entirely any interruption of power during gear ratio changes and avoids the inherent shift control difficulties of ASMs. This invention, however, also reduces the magnitude of parasitic losses inherent in the operation of an automatic transmission to a much lower magnitude than the losses associated with a conventional ASM transmission.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple speed power transmission, particularly for motor vehicles, comprising:

an input;

a first layshaft driveably connectable through a first power to the input, and supporting a first pinion thereon;

a clutch for alternately connecting and disconnecting the input and first layshaft;

a first coupler for releasably coupling the first pinion and first layshaft;

a second layshaft driveably connected through a second power path and a one-way drive connection to the input, supporting a second pinion thereon;

a second coupler for selectively releasably coupling the second pinion and second layshaft; and an output shaft supporting a gear thereon, said gear being in meshing engagement with the first pinion and second pinion.

2. The transmission of claim 1, wherein the first coupler and second coupler are synchronizers.

3. The transmission of claim 1, wherein the first coupler is a member of a group consisting of synchronizers and dog clutches.

4. The transmission of claim 1, wherein the second coupler is a member of a group consisting of synchronizers and dog clutches.

5. The transmission of claim 1, wherein each of the first coupler and second coupler is a member of a group consisting of synchronizers and dog clutches.

6. The transmission of claim 1, wherein the one-way drive connection is a member of the group consisting of a one-way clutch, a sprag one-way clutch, a roller- one-way clutch, and a mechanical diode.

7. The transmission of claim 1, wherein the clutch is a friction clutch.

8. The transmission of claim 1, wherein:

the first layshaft is driveably connected to the input through the first power path comprising a clutched input, a third pinion supported on the clutched input, and a third gear supported on the first layshaft in meshing engagement with said third pinion; and the second layshaft is driveably connected to the input through the second power path comprising a fourth pinion supported on the input, and a fourth gear supported on the second layshaft in meshing engagement with said fourth pinion.

9. The transmission of claim 1, wherein:

the first layshaft is driveably connected to the input through a first power path comprising a third pinion supported on a clutched input, and a third gear supported on the first layshaft in meshing engagement with said third pinion; and the second layshaft is driveably connected to the input through a second power path comprising a fourth pinion supported on the input, a fourth gear supported on the second layshaft in meshing engagement with said fourth pinion.

10. The transmission of claim 8, wherein the first power path produces a first speed ratio, and the second power path produces a second speed ratio that is less than the first speed ratio.

11. The transmission of claim 9, wherein the first power path produces a first speed ratio, and the second power path produces a second speed ratio that is less than the first speed ratio.

12. The transmission of claim 8, wherein the first power path produces a first ratio of the rotational speeds of the first layshaft and input, and the second power path produces a second ratio of the rotational speeds of the second layshaft and input that is less than the first speed ratio.

13. The transmission of claim 9, wherein the first power path produces a first ratio of the rotational speeds of the first layshaft and input, and the second power path produces a second ratio of the rotational speeds of the second layshaft and input that is less than the first ratio.

14. A multiple speed ratio power transmission, particularly for motor vehicles, comprising:

an input;

a first layshaft driveably connectable through a first power path to the input, supporting a first pinion and a first set of pinions thereon;

a clutch for alternately connecting and disconnecting the input and first layshaft;

a first coupler having a selectable coupling member supported for movement on the first coupler, the first coupler releasably coupling a pinion of the first pinion set and said first layshaft in response to movement of the coupling member;

a second layshaft driveably connected through a second power path and a one-way drive connection to the input, supporting a second pinion and a second set of pinions thereon;

a second coupler having a selectable second coupling member supported for movement on the second coupler, the second coupler releasably coupling a pinion of the second pinion set and said second layshaft in response to movement of the second coupling member; and an output supporting a gear thereon, said gear being in meshing engagement with the first pinion and second pinion, and further supporting a set of gears thereon, each gear of said set of gears being in meshing engagement with a pinion of the first pinion set and a pinion of the second pinion set.

15. The transmission of claim 14, wherein the input is adapted for connection to a power source, and the output is adapted for connection to a load.

16. The transmission of claim 14, wherein:

the first layshaft is driveably connected to the input through a first power path comprising an input shaft, a third pinion supported on the input shaft, and a third gear supported on the first layshaft in meshing engagement with said third pinion; and the second layshaft is driveably connected to the input by a second power path comprising a fourth pinion supported on the input, and a fourth gear supported on the second layshaft in meshing engagement with said fourth pinion.

17. The transmission of claim 14, wherein:

the first layshaft is driveably connected to the input through a first power path comprising a third pinion supported on the input, and a third gear supported on the first layshaft in meshing engagement with said third pinion; and the second layshaft is driveably connected to the input through a second power path comprising a fourth pinion supported on the input, a fourth gear supported on the second layshaft in meshing engagement with said fourth pinion.

18. The transmission of claim 16, wherein the first power path produces a first speed ratio, and the second power path produces a second speed ratio that is less than the first speed ratio.

19. The transmission of claim 17, wherein the first power path produces a first speed ratio, and the second power path produces a second speed ratio that is less than the first speed ratio.

20. The transmission of claim 16, wherein the first power path produces a first ratio of the rotational speeds of the first layshaft and input shaft, and the second power path produces a second ratio of the rotational speeds of the second layshaft and input that is less than the first speed ratio.

21. The transmission of claim 17, wherein the first power path produces a first ratio of the rotational speeds of the first layshaft and input, and the second power path produces a second ratio of the rotational speeds of the second layshaft and input that is less than the first speed ratio.

22. The transmission of claim 14, further comprising:

primary pinion-gear pairs, the pinions of said primary pairs being supported on, and spaced mutually along the first layshaft, the gears of said primary pairs being in engagement with the pinions of said primary pairs, supported on, and spaced mutually along the output; and primary couplers connected to the first layshaft, each primary coupler having a selectable coupling member supported for movement on the corresponding primary coupler, for releasably coupling a pinion of the primary pinion-gear pairs and said first layshaft in response to movement of said coupling member.

23. The transmission of claim 22, further comprising:

secondary pinions supported on, and spaced mutually along the second layshaft, each secondary pinion being engaged with a gear of a primary pinion-gear pair; and secondary couplers connected to the second layshaft, each secondary coupler having a selectable coupling member supported for movement on a corresponding secondary coupler for releasably coupling a secondary pinion and said second layshaft in response to movement of said coupling member.

24. The transmission of claim 22, further comprising:

a reverse pinion supported on the first layshaft;

a reverse gear supported on the output; and a reverse idler engaged with the reverse pinion and reverse gear, and wherein a primary coupler driveably connects the reverse pinion and the first layshaft.

* * * * *